United States Patent
Griffith et al.

(10) Patent No.: US 10,583,485 B2
(45) Date of Patent: Mar. 10, 2020

(54) SYSTEM AND METHOD FOR CONTROLLING AN ENERGY BEAM OF AN ADDITIVE MANUFACTURING SYSTEM

(71) Applicant: HONEYWELL FEDERAL MANUFACTURING & TECHNOLOGIES, LLC, Kansas City, MO (US)

(72) Inventors: Brett E. Griffith, Kansas City, MO (US); Christopher L. Boucher, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 455 days.

(21) Appl. No.: 15/404,316

(22) Filed: Jan. 12, 2017

(65) Prior Publication Data
US 2018/0193918 A1   Jul. 12, 2018

(51) Int. Cl.
| | |
|---|---|
| B22F 3/105 | (2006.01) |
| B33Y 30/00 | (2015.01) |
| B33Y 50/02 | (2015.01) |
| B33Y 10/00 | (2015.01) |
| G05B 19/4099 | (2006.01) |
| B29C 64/135 | (2017.01) |

(52) U.S. Cl.
CPC .......... *B22F 3/1055* (2013.01); *B33Y 10/00* (2014.12); *B33Y 30/00* (2014.12); *B33Y 50/02* (2014.12); *G05B 19/4099* (2013.01); *B22F 2003/1056* (2013.01); *B22F 2003/1057* (2013.01); *B29C 64/135* (2017.08); *G05B 2219/49007* (2013.01); *Y02P 10/295* (2015.11)

(58) Field of Classification Search
CPC ............ B22F 3/1055; B22F 2003/1056; B22F 2003/1057; G05B 19/4099; G05B 2219/49007; B29C 64/135; B33Y 10/00; B33Y 30/00; B33Y 50/02; Y02P 10/295
USPC .................................................. 425/78, 375
See application file for complete search history.

(56) References Cited

U.S. PATENT DOCUMENTS

| | | | |
|---|---|---|---|
| 8,691,329 B2 | 4/2014 | Qi et al. | |
| 2002/0065573 A1 | 5/2002 | Mazumder et al. | |
| 2012/0266814 A1 | 10/2012 | Clark et al. | |
| 2012/0267345 A1 | 10/2012 | Clark et al. | |
| 2014/0265049 A1* | 9/2014 | Burris | B23K 26/034 |
| | | | 264/497 |

(Continued)

OTHER PUBLICATIONS

Jain et al., Tailoring Material Properties in Layered Manufacturing, Proceedings of the World Congress on Engineering 2010, vol. III WCE 2010 (Jun. 30-Jul. 2).

*Primary Examiner* — Joseph S Del Sole
*Assistant Examiner* — Lawrence D. Hohenbrink, Jr.
(74) *Attorney, Agent, or Firm* — Hovey Williams LLP

(57) ABSTRACT

An additive manufacturing system includes an energy beam generator that generates an energy beam to melt and fuse raw materials for a part and a computing device that controls operation of the energy beam generator. The computing device includes a memory element that stores or access a three-dimensional model of the part, and a processing element that receives at least a portion of the three-dimensional model and controls a parameter of the energy beam generator according to a gradient function so as to apply a variable amount of heat to the raw material that forms an overhang on the part.

5 Claims, 4 Drawing Sheets

(56) References Cited

U.S. PATENT DOCUMENTS

2015/0033561 A1    2/2015  Bruck et al.
2015/0096963 A1    4/2015  Bruck et al.
2017/0334144 A1*  11/2017  Fish ...................... B33Y 50/02

* cited by examiner

SYSTEM AND METHOD FOR CONTROLLING AN ENERGY BEAM OF AN ADDITIVE MANUFACTURING SYSTEM

STATEMENT REGARDING FEDERALLY-SPONSORED RESEARCH OR DEVELOPMENT

This invention was made with government support under Contract No.: DE-NA0000622 awarded by the Department of Energy. The government has certain rights in the invention.

BACKGROUND OF THE INVENTION

Field of the Invention

Embodiments of the present invention relate to systems and methods for controlling an energy beam in an additive manufacturing system.

Description of the Related Art

Additive manufacturing systems such as 3D printers create parts by adding material in successive steps as opposed to traditional subtractive processes that start with a block of raw material and then remove portions of the material by machining or other operations. A typical additive manufacturing system broadly includes a raw material bed; an energy beam generator and beam steering system; and a controller. The raw material bed holds raw material such as powdered metals or metal alloys. The energy beam generator generates and projects an energy beam, through the beam steering system, onto the raw material to melt particles of the raw material and fuse them together. The controller and beam steering system control the output power, scan speed, and scan path of the energy beam generator while forming the part.

To create a part with an additive manufacturing system, a three-dimensional computer model of the part is first created or obtained. The model may include coordinates of the material boundaries or surface area dimensions of the part. The model is then loaded into the controller or otherwise made accessible to the controller. A first layer of raw material is then deposited onto the material bed by a material dispenser or hopper. The energy beam then melts and fuses the raw material that lies within the boundaries of a first cross section of the part. After all of the raw material that forms the first cross section of the part has been melted and fused, the material bed may be lowered into a shaft so that a second layer of raw material may be deposited into the bed on top of the first layer. The energy beam is then again activated and moved via the beam steering system to melt and fuse the raw material that lies within the boundaries of the second cross section of the part. The process continues until all cross sections of the part have been formed.

The quality of a part formed by additive manufacturing relies, to a large extent, on proper heating and cooling of the raw material, and the proper amount of heating depends on the geometry of the part, as some parts require different energy input levels for different portions of the parts. For example, many parts have overhangs with down-facing surfaces, and fabricating such overhangs via additive manufacturing is challenging because overhangs have no supporting material underneath them. If the same amount of laser energy is applied to the raw materials that make up an overhang as other portions of the part, the overhang will often burn, curl, droop, or have other undesirable surface ripplings or distortions.

One solution to this problem is to decrease the output power and/or increase the path speed of the energy beam generator over the raw material that makes up the overhang so as to avoid overheating the raw material. But switching the energy beam generator output power and/or scan speed in a step function manner, which is the currently accepted practice, creates undesirable seam lines in the part at the point the output power and/or scan speed is changed. These issues prevent current additive manufacturing systems from producing high quality parts with overhangs and/or other challenging geometries.

SUMMARY OF THE INVENTION

Embodiments of the present invention solve the above-mentioned problems and provide a distinct advance in the art of additive manufacturing systems. More particularly, embodiments of the invention provide systems, devices, and methods for controlling the output power and/or scan speed of an energy beam generator and beam steering system whenever the energy beam generator approaches material used to form an overhang of a part in such a way as to avoid overheating of the overhang and forming undesirable seam lines near the overhang.

One embodiment of the invention is an additive manufacturing system broadly comprising an energy beam generator and a computing device. The energy beam generator generates an energy beam which melts and fuses raw material to manufacture a part.

The computing device controls the operation of the energy beam generator and/or a beam steering system and includes a memory element and a processing element. The memory element is configured to store or access a three-dimensional model of the part. The processing element receives the three-dimensional model, determines path lines for the energy beam across the raw material, calculates a power output for the energy beam generator for the path lines, and calculates a scan speed for the energy beam generator.

In accordance with an important aspect of the invention, the processing element controls the output power and/or the scan speed of the energy beam generator according to a gradient function so as to precisely control the amount of heat applied to different portions of the scan path used to create the part. For example, the processing element may direct the energy beam generator to operate at a reduced, user-selected output power over raw materials that form an overhang of a part and then slowly increase the output power according to a user defined gradient function as the energy beam approaches a boundary of the overhang. This prevents burning, curling, dealloying, and other deformations in the overhang while also avoiding a sudden output power change that could result in a seam line in the part adjacent the overhang.

In another embodiment, the processing element may direct the energy beam generator to operate at a faster scan speed over the raw material that forms the overhang and then slowly and continuously decrease the scan speed according to a gradient function as the energy beam approaches a boundary of the overhang. This also prevents burning, curling, dealloying, and other deformations in the overhang while also avoiding a sudden change in the scan speed that could result in a seam line in the part.

In still other embodiments, the processing element may adjust both the output power and the scan speed of the energy beam generator near the boundary of the overhang according to one or more user defined gradient functions so as to even more precisely control the amount of heat applied to different portions of the scan path used to create the part. For example, the processing element may operate the energy beam generator at a reduced, user-selected output power and an increased, user-selected scan speed over the raw materials forming the overhang and then slowly increase the output power according to a first gradient function and decrease the scan speed according to a second, different gradient function as the energy beam approaches a boundary of the overhang.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
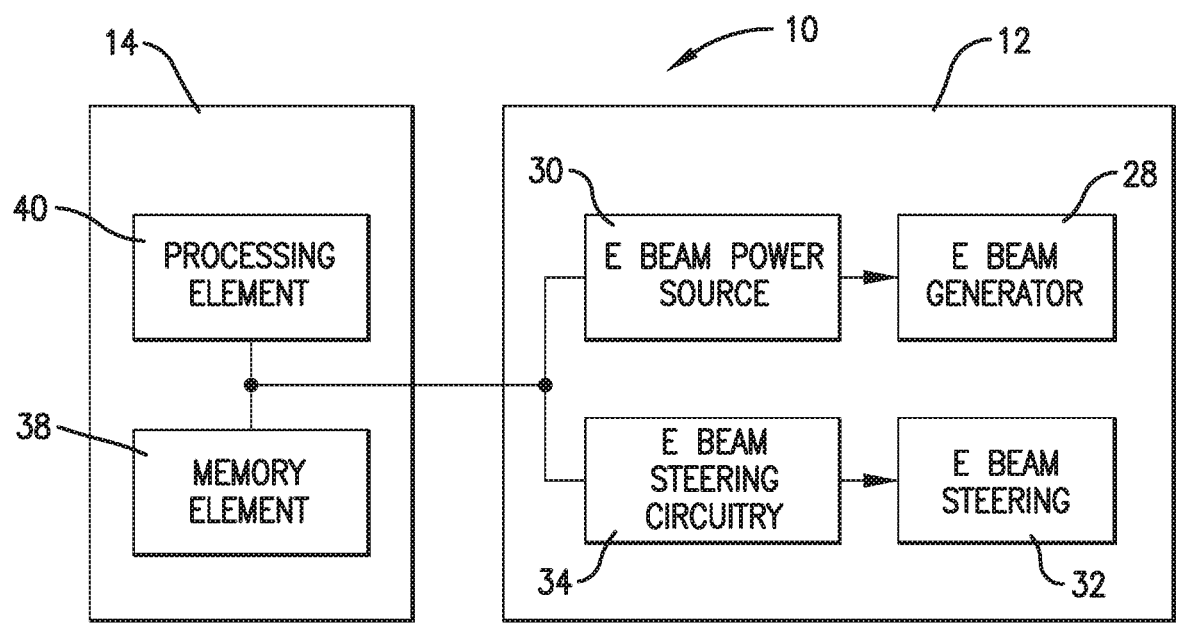
FIG. 1 is a schematic block diagram of selected components of an additive manufacturing system constructed in accordance with various embodiments of the present invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
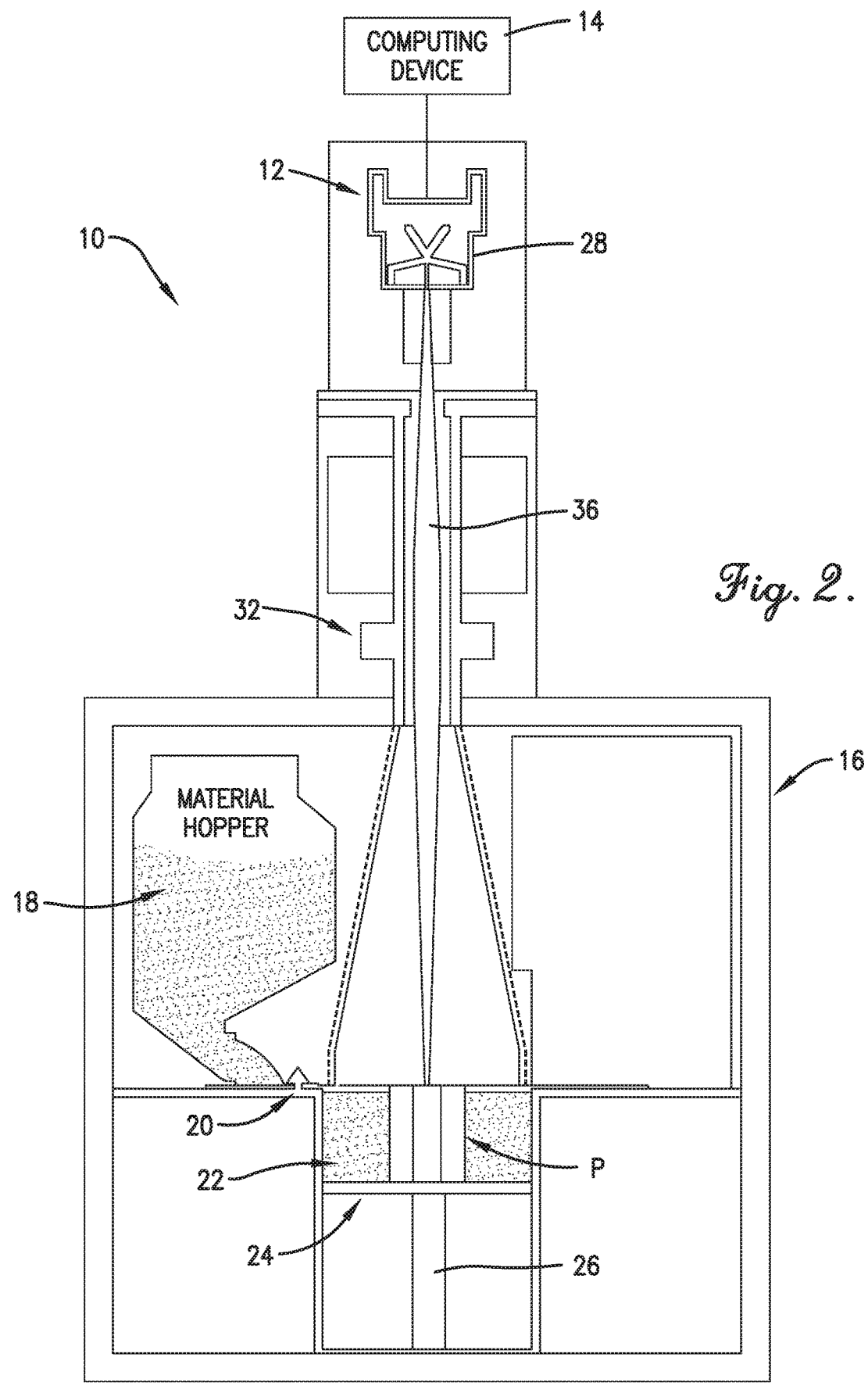
FIG. 2 is a front vertical sectional view of a more specific embodiment of the additive manufacturing system showing an energy beam generator directing an energy beam onto raw material through a beam steering system.

An additive manufacturing system 10 constructed in accordance with an embodiment of the present invention is shown in FIG. 1 and broadly comprises an energy beam generator assembly 12 and a computing device 14. A more specific embodiment of the additive manufacturing system 10 is shown in FIG. 2 forming a part P and includes a housing 16, one or more raw material hoppers 18, a rake 20, a build tank 22, a raw material plate 24, the energy beam generator assembly 12, and the computing device 14. Each of these components is described in more detail below.

The energy beam generator assembly 12 generates an energy beam used to melt and fuse raw material for the part P. The computing device controls the operation of the energy beam generator assembly 12 and other components of the additive manufacturing system 10. Specific embodiments of the energy beam generator assembly 12 and computing device 14 are described in more detail below.

The housing 16 stores and forms a vacuum and/or inert atmosphere using a flood or cover gas around at least a portion of the other components of the system 10. One embodiment of the housing 16 includes four side walls, a top wall, and a bottom wall all formed from high strength materials such as steel. One or more of the walls may have openings to provide access to other components and/or may be removable.

The raw material hopper 18 retains a supply of raw material to be delivered to the build tank 22. Typically, the raw material is a powdered form of one or more metals, such as aluminum, copper, gold, silver, titanium, cobalt, chrome, carbon steel, or the like, or alloys, such as aluminum 6061, aluminum 7075, titanium T6Al4V, and so forth. The raw material hopper 18 may have a generally box or cylindrical shape with an open top to receive raw material and a funneled bottom. The raw material hopper 18 may also include a side chute with a slidable door that opens to release the raw material. The additive manufacturing system 10 may further include a landing located beside the build tank onto which raw material is deposited from the raw material hopper. Embodiments of the additive manufacturing system may include two raw material hoppers positioned on opposing sides of the build tank.

The rake 20 pushes the raw material from the landing under the raw material hopper 18 into the build tank 22. The rake 20 may be elongated and have a triangular, rectangular, circular, square, or other cross-section with one or more edges that contact the raw material. The system 10 may include actuating devices that push and/or pull the rake in order to move the raw material.

The build tank 22 retains the raw material in place while the part P is being formed. The build tank 22 may include a cylinder or four vertically-oriented walls that form a shaft through which the raw material bed can slide. The build tank 22 may be positioned in the left, center, or right of the lower half of the housing.

The raw material plate 24 retains one layer of raw material that is used to form a portion of the part P. The raw material plate 24 may have a thin rectangular, circular, or square shape and may be constructed from metals or similar hardened materials. Various embodiments of the raw material plate may include a non-stick coating on an upper surface thereof. The raw material plate 24 may be positioned within the build tank 22 such that the edges of the raw material plate contact the sides of the build tank. In other embodiments, the raw material plate 24 may have a surface area that is smaller than the area of the opening of the build tank, such that there is a gap between the edges of the raw material plate and the sides of the build tank. An arm 26 may be connected to the bottom surface of the raw material plate 24 to actuate the plate up and down within the build tank. Alternatively, the bottom surface of the raw material plate may be connected to another plate which itself is actuated, so that the combination of the raw material plate and the plate move up and down within the build tank.

An embodiment of the energy beam generator assembly 12 is shown in FIG. 1 and includes an energy beam generator 28, an energy beam power source 30, an energy beam steering system 32, and an energy beam steering system circuitry 34.

The energy beam generator 28 generates an energy beam 36 used to melt and fuse the raw materials on the raw material plate 24. The energy beam generator 28 may include known energy beam generation and acceleration components such as a high-voltage filament/cathode/anode combination, flash lamps, diodes, mirrors, lenses, coils, or other components to prevent astigmatism and focus the energy beam, and the like. The power of the energy beam may be proportional to an electric current, voltage, or other electrical characteristic received by the energy beam generator. The energy beam generator 28 may be positioned on an upper surface of the top wall of the housing 16 and may generate the energy beam downward through an opening in the top wall of the housing.

The energy beam power source 30 controls the power delivered by the energy beam by controlling the electric current supplied to the energy beam generator 28. The energy beam power source 30 may include transformers, rectifiers, regulators, amplifiers, filters, and the like, all of which are capable of handling large values of electric current. The energy beam power source 30 may receive a signal, data, or combinations thereof from the computing device 14. The signal may include a current, a voltage, a resistance, or the like which is amplified, transformed, used as a trigger, or otherwise modified to set the value of the electric current supplied to the energy beam generator. The data from the computing device 14 may provide instructions on electric current level control or a sequence of values for the electric current supplied to the energy beam generator. In other embodiments, the energy beam power source 30 may alternatively or additionally control a voltage or other electrical characteristic or property that is supplied to the energy beam generator.

The energy beam steering system 32 controls the motion of the energy beam 36. The energy beam steering system 32 may include one or more electric coils, one or more pairs of electric plates, one or more mirrors, one of more lenses, or the like, or combinations thereof. The energy beam steering system 32 may be positioned along the axis or trajectory of the energy beam 36 such that the energy beam passes through and/or between the coils, plates, mirrors, and lenses. The energy beam steering system 32 may generate magnetic and/or electric fields or use reflective or transmissive properties that steer or deflect the energy beam to follow the path lines to melt the raw material as discussed in more detail below.

The energy beam steering system circuitry 34 controls the operation of the energy beam steering system 32. The energy beam steering system circuitry 34 may include transformers, rectifiers, regulators, amplifiers, filters, and the like. The energy beam steering system circuitry 34 may receive a signal, data, or combinations thereof from the computing device 14. The signal may include a current, a voltage, a resistance, or the like which is amplified, transformed, used as a trigger, or otherwise modified to set a level of electric current, voltage, or other electrical characteristic or property that is supplied to the energy beam steering system. The data from the computing device may provide instructions, a sequence of values, or the like to set the level of electric current, voltage, or other electrical characteristic or property that is supplied to the energy beam steering system.

An embodiment of the computing device 14 is also shown in FIG. 1 and comprises a memory element 38 and a processing element 40. As described in more detail below, the computing device 14 sets and controls the output power, scan path, and/or scan speed of the energy beam 36. In some embodiments, the computing device 14 may be integrated with, housed within, or considered part of the additive manufacturing system 10. In other embodiments, the computing device 14 may be a standalone unit that is in electronic communication with the additive manufacturing system 10. The computing device 14 and/or the additive manufacturing system 10 may further comprise a display, a user interface such as a keyboard and mouse, a communication element to allow the device and/or machine to communicate wirelessly or through wires with other devices or systems, and so forth.

The memory element 38 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 38 may be embedded in, or packaged in the same package as, the processing element. The memory element 38 may include, or may constitute, a "computer-readable medium". The memory element may store the instructions, code, code segments, software, firmware, programs, applications, apps, services, daemons, or the like that are executed by the processing element 40. The memory element may also store settings, data, documents, sound files, photographs, movies, images, databases, and the like.

The processing element 40 is configured or programmed, through hardware, firmware, software, or combinations thereof, to perform the functions described herein. The processing element 40 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 40 may execute, process, or run instructions, code, code segments, software, firmware, programs, applications, apps, processes, services, daemons, or the like. The processing element may also include hardware components such as finite-state machines, sequential and combinational logic, and other electronic circuits that can perform the functions necessary for the operation of the current invention. Furthermore, the processing element may include electronic circuitry such as digital to analog converters, amplifiers, and so forth. The processing element 40 may be in communication with the other electronic components through serial or parallel links that include universal busses, address busses, data busses, control lines, and the like.

Operation of the additive manufacturing system 10 will now be described in more detail. First, a three-dimensional computer model of a part to be manufactured is created or obtained. The model may be created by conventional design programs or may be created by scanning an already finished part. The model may include coordinates of material boundaries of the part.

Raw material is then loaded into the raw material hopper 18, and a portion of the raw material is released onto the landing. The raw material plate 24 is initially positioned in the build tank 22 at a depth of one cross section thickness. The rake 20 then pushes the raw material into the raw material plate 24 such that the raw material is evenly distributed thereon.

The energy beam generator 28 then generates an energy beam 36, either continuously or in an interrupted manner, and directs the energy beam 36 onto the raw material. The computing device 14 provides input to the energy beam power source 30 and the energy beam steering system circuitry 34 to control the output power, the motion, and the scan speed of the energy beam 36. The energy beam 36 is guided to scan or follow a path, which may be determined after the computer model for the part is created. The path may include a plurality of spaced-apart parallel lines that follow a serpentine pattern. Typically, the path begins at one edge or side of the part, zig-zags back and forth across the surface, and ends at an opposing edge or side of the part. The energy beam 36 creates a melt pool around the spot where the raw material is melted. As the melted material cools, it fuses. Once the energy beam 36 has been guided to scan the entire path, it is turned off.

Once one layer or section of the part is formed, the raw material plate 24 is lowered in the build tank 22 by a distance equal to one cross-sectional thickness of the part. The raw material hopper 18 may release more raw material, or there may be sufficient raw material left on the landing. In either case, the rake 20 moves a second layer of raw material into the raw material plate 24 to be placed on top of the first layer of unmelted raw material and the first cross section. The energy beam generator 28 then again generates and directs using the beam steering system 32 an energy beam onto the raw material. Once the energy beam has been guided along the entire path for the second layer or section, it is turned off. The process of adding raw material and forming cross sections, as described above, continues until all of the cross sections of the part have been formed. Excess raw material stuck to the cross sections may be removed with Pressurized Air, Brushing, Electrical Discharge Machining, Milling, Turning, Abrasive Blasting, Tumbling and the like—after which, the part is complete.

Specific functions of the computing device 14 while implementing an additive manufacturing process will now be described in more detail. The processing element 40 receives, from an external device, machine, or system, the three-dimensional model of the part to be created. The model may be stored in the memory element 38. The model may include surface area dimensions, coordinates of boundaries, and/or similar data that define each of the cross sections of the part. From this data, the processing element 14 may generate the energy beam scan path for each cross section of the part.

Once the path for each cross section is generated, the processing element 40 determines the output power of the energy beam and the scan speed with which the energy beam scans or travels along each line. The calculations may be performed for all of the lines and stored in the memory element before the energy beam scanning process to form the part begins. Alternatively, the calculation of the values of the energy beam power and the energy beam scan speed for each line may be performed as needed, such as before each line is scanned during the process of forming the part. In other embodiments, the values of the energy beam power and the energy beam scan speed for lines of a plurality of lengths may be stored as a table in the memory element 38. The processing element 40 may access the memory element and look up the values of the energy beam power and the energy beam scan speed.

Once the path for each cross section has been determined and the values of the energy beam power and the energy beam scan speed for each line have either been calculated or are ready to be accessed, the processing element 40 may initiate the scanning and melting process that forms the part. The processing element may communicate with the energy beam power source 30 and the energy beam steering system circuitry 34 to generate the energy beam with a certain power and to deflect, guide, steer, or move the energy beam to scan the path with a certain scan speed.

In some embodiments, the processing element 40 may transmit a first signal to the energy beam power source 30, wherein the first signal includes an electrical characteristic, such as an electric current, a voltage, a resistance, etc., which is varied according to the value of the energy beam power for the currently-scanned line. For example, the first signal having a greater electric current may correspond to a greater energy beam power. In other embodiments, the processing element 40 may transmit data to the energy beam power source 30 which includes instructions, a sequence of values, or the like that sets the level of the energy beam power for the currently-scanned line.

Likewise with the scan speed, the processing element 40 may transmit a second signal to the energy beam steering system circuitry 34, wherein the second signal includes an electrical characteristic, such as an electric current, a voltage, a resistance, etc., which is varied according to the value of the energy beam scan speed for the currently-scanned line. For example, the second signal having a greater electric current may correspond to a greater energy beam scan speed. In other embodiments, the processing element 40 may transmit data to the energy beam steering system circuitry 34 which includes instructions, a sequence of values, or the like that sets the level of the energy beam scan speed for the currently-scanned line. The processing element may also transmit a third signal or data to the energy beam steering system circuitry that provide the direction in which to guide, deflect, steer, or move the energy beam to scan the path.

The processing element 40 may continue to transmit signals and/or data the energy beam power source 30 and the energy beam steering system circuitry 34 that set values or levels for the energy beam power, the energy beam scan speed, and the energy beam direction for each line. The transmission may occur before each line is scanned. In alternative embodiments, the energy beam power source and the energy beam steering system circuitry may include data storage components capable of storing a sequence of values. In such embodiments, the processing element 40 may transmit the data to the energy beam power source 30 and the energy beam steering system circuitry 34 for the energy beam power, the energy beam scan speed, and the energy beam direction for all the lines of the path before the scan and melt process begins. In addition, the processing element 40 may communicate with and provide control of components such as the raw material hopper, the rake, and the raw material plate. Thus, the processing element may transmit signals and/or data to those components to set the height of the raw material plate, release raw material, and spread it on to the raw material plate before each cross section is formed. When all of the cross sections have been formed, the processing element may transmit an alert, such as activating a light, sounding an alarm, or sending a message, that the part is complete.

Figure 3:
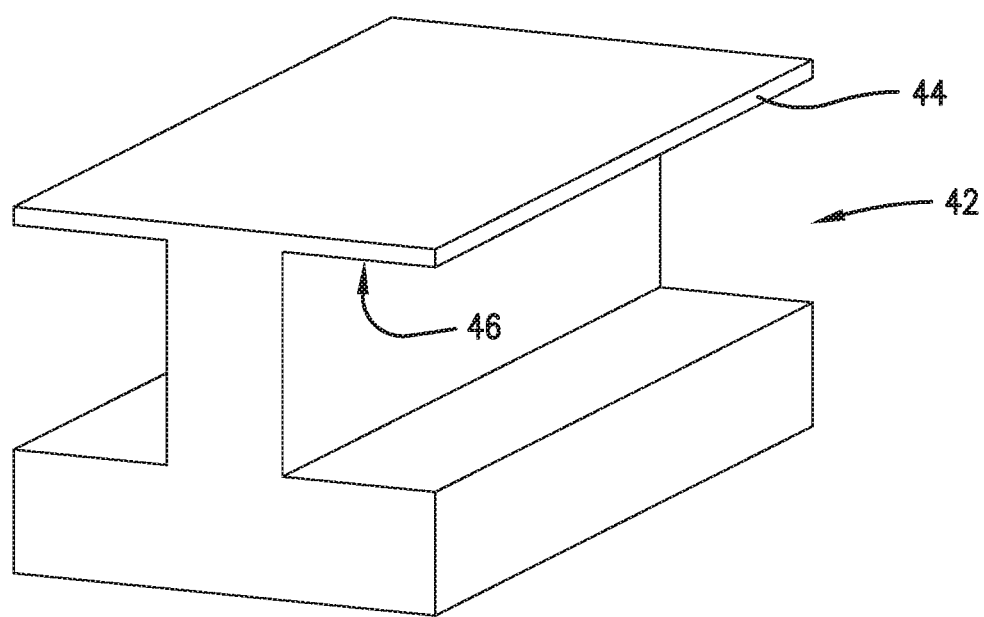
FIG. 3 is a perspective view of a part created with the additive manufacturing system of the present invention.
Figure 4:
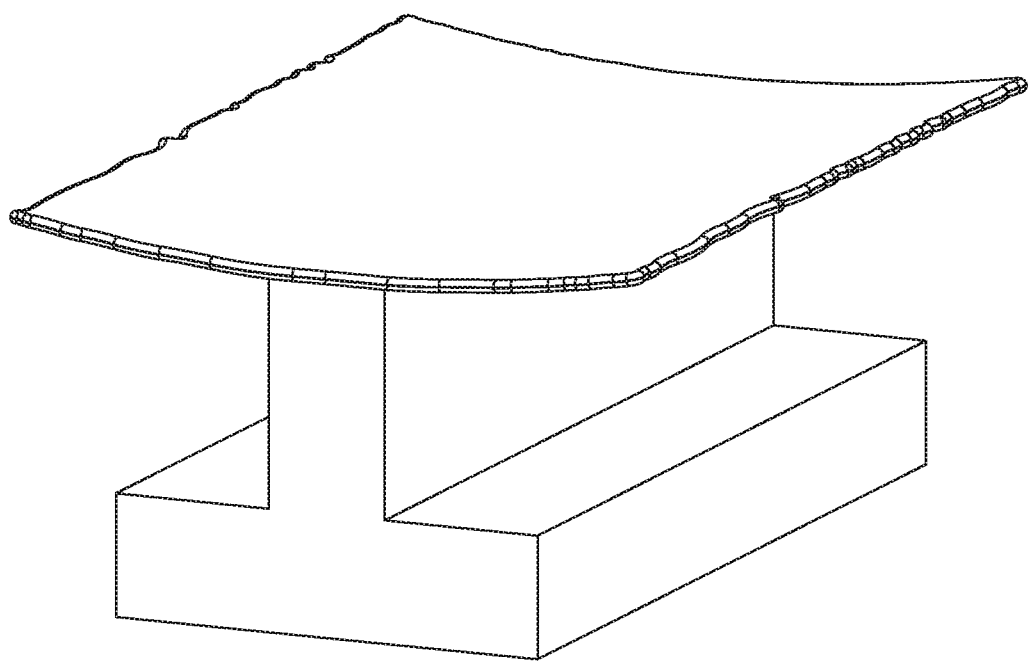
FIG. 4 is a perspective view of a part created using prior art additive manufacturing techniques.

As mentioned above, the quality of a part fabricated with an additive manufacturing process relies, to a large extent, on proper heating and cooling of the raw material. The proper amount of heating may vary depending on the geometry of the part, especially if the part has complex shapes and/or portions of varying thickness. For example, a part 42 may have an overhang 44 and a down-facing surface 46 as shown in FIG. 3. Such a part requires specific and varied heating, because the overhang requires different amounts of heat than other portions of the part because the overhang 44 has no supporting material underneath it. If the same amount of energy beam energy were applied to the raw materials that make up the overhang 44 as other portions of the part, the overhang 44 would burn, curl, droop, or have other undesirable surface ripplings or distortions as shown in FIG. 4.

One solution to this problem is to decrease the power output and/or increase the path speed of the energy beam generator 28 and beam steering system 32 over the raw material that makes up the overhang 44 to avoid overheating the raw material. But switching the energy beam generator power and/or speed in a step function manner may create undesirable seam lines in the part at the point the output power and/or scan speed is changed.

The present invention provides a novel way to form a part with an overhang without burning the material in the overhang forming seam lines near the overhang. Rather than abruptly switching the output power or scan speed of the energy beam 36, the processing element 40 of the present invention controls the power output and/or the scan speed of the energy beam generator 28 and beam steering system 32 according to one or more gradient functions so as to avoid any burning, curling, or other distortions on the overhang 44 and to prevent seam lines. This varies the amount of heat applied to different portions of the part so that less heat is applied to materials forming the overhang 44 but in a more controlled manner.

In one embodiment, the processing element 40 directs the energy beam generator 28 to operate at a reduced, user-selected, output power over raw materials that form the overhang 44 and then slowly increase the output power according to a gradient function as the energy beam approaches a boundary of the overhang. This avoids burning or otherwise damaging the material for the overhang while simultaneously avoiding a sudden output power change that could result in a seam line in the part adjacent the overhang. In this embodiment, the gradient function may be linear, parabolic, or other function providing a continuous transition from the reduced power level to the desired power level for use on the adjacent area.

In another embodiment, the processing element 40 directs the energy beam steering system 32 to operate at a faster scan speed over the raw material that forms the overhang 44 and then slowly decrease the scan speed according to a gradient function as the energy beam approaches a boundary of the overhang. This also avoids burning or otherwise damaging the material for the overhang while simultaneously avoiding a sudden change in the scan speed that could result in a seam line in the part. In this embodiment, the gradient function may be linear, parabolic, or other function providing a continuous transition from the increased speed to the desired speed for use on the adjacent area.

In still other embodiments, the processing element 40 may adjust both the output power and scan speed of the energy beam generator 28 and beam steering system 32 near the boundary of the overhang 44 according to one or more gradient functions so as to avoid sudden changes in the output power and scan speed. For example, the processing element 40 may operate the energy beam generator 28 and beam steering system 32 at a reduced, user-selected output power and an increased, user-selected scan speed over the raw materials forming the overhang and then slowly increase the output power according to a first gradient function and decrease the scan speed according to another different gradient function as the energy beam approaches a boundary of the overhang. In this embodiment, the gradient function may be linear, parabolic, or other function providing a continuous transition from the increased speed and reduced power level to the desired speed and power level for use on the adjacent area.

The gradient functions used to adjust the output power and/or scan speed of the energy beam may be selected based on the geometry of the part to be fabricated. In some embodiments, the gradient functions are linear, parabolic, or other mathematically derived functions developed to provide the desired energy input to control the heating and cooling across areas of the material. These functions may be derived through the use of computer simulation to determine the amount of energy required to fully melt the material, but allow for sufficient heat dissipation through the underlying surface to avoid burning, curling, drooping, or other distortions. The functions may also be determined through setting up an array of parts on the build plate and adjusting the function in a controlled manner to determine the optimal variables to achieve the desired geometry without burning, curling, drooping, or other distortions.

Figure 5:
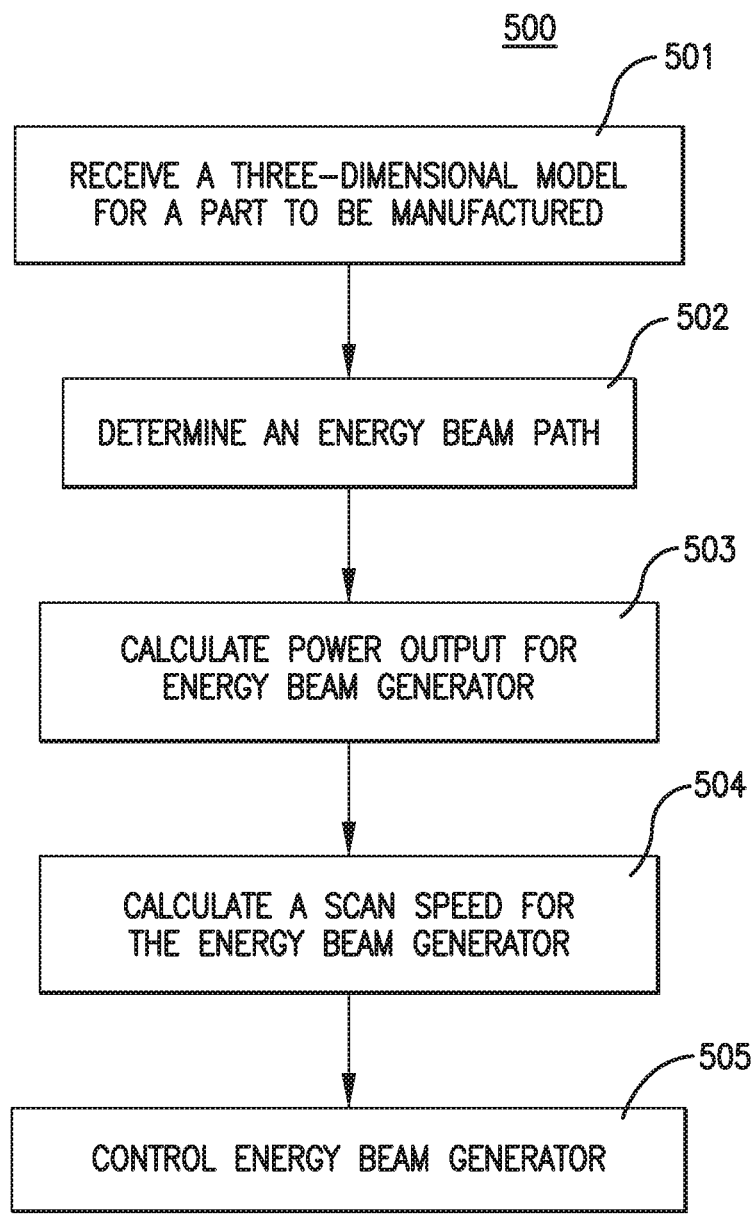
FIG. 5 is a flow diagram listing at least a portion of the steps of a method for controlling the operation of the additive manufacturing system of the present invention.

Another aspect of the invention may provide a method 500 for controlling the operation of the additive manufacturing system 10 described above. At least a portion of the steps of the method are shown in FIG. 5. The steps may be performed in the order shown in FIG. 5, or they may be performed in a different order. Furthermore, some steps may be performed concurrently as opposed to sequentially. In addition, some steps may be optional. The steps may be performed by the computing device described above.

Referring to step 501, a three-dimensional model is received, the model including data defining a plurality of cross sections of the part to be manufactured and data representing one or more overhangs on the part. The model may include surface area dimensions, coordinates of boundaries, and/or similar data that define each of the cross sections of the part. Each cross section may be a portion of the part created by virtually sectioning the part into thin, parallel, planar pieces. In an XYZ coordinate system, the sectioning may occur along the XY, YZ, or XZ plane or at angles to any of the planes. An exemplary part 42 is shown in FIG. 3. The model may be created by an external device, machine, or system which scans an already finished part and then virtually sections the part along a convenient plane.

Referring to step 502, an energy beam path across a surface of each cross section is determined. The path may include a plurality of spaced-apart parallel lines that follow a serpentine pattern. Typically, the path begins at one edge or side of the boundary for the current cross section, zig-zags back and forth across the surface, and ends at an opposing edge or side of the boundary.

Referring to step 503, an output power for the energy beam to scan each of the lines is calculated. Rather than abruptly switching the output power of the energy beam, the processing element 40 controls the power output of the energy beam generator according to a gradient function so as to avoid any burning, curling, or other distortions on the overhangs and to prevent seam lines. This varies the amount of heat applied to different portions of the part so that less heat is applied to materials forming the overhang in a part. In one embodiment, the processing element directs the energy beam generator to operate at a reduced, user-selected, output power over raw materials that form the overhang and then slowly increase the output power according to the gradient function as the energy beam approaches a boundary of the overhang.

Referring to step 504, a scan speed for the energy beam for each of the lines is calculated. In this step, the processing element 40 directs the energy beam generator 28 and beam steering system 32 to operate at a faster scan speed over the raw material that forms the overhang 44 and then slowly decrease the scan speed according to a gradient function as the energy beam approaches a boundary of the overhang. This also avoids burning or otherwise damaging the material for the overhang while simultaneously avoiding a sudden change in the scan speed that could result in a seam line in the part.

In other embodiments, steps 503 and 504 adjust both the output power and scan speed of the energy beam generator near the boundary of the overhang according to one or more gradient functions so as to avoid sudden changes in the output power and scan speed. For example, the processing element 40 may operate the energy beam generator 28 and beam steering system 32 at a reduced, user-selected output power and an increased, user-selected scan speed over the raw materials forming the overhang and then slowly increase the output power and decrease the scan speed according to one or more gradient functions as the energy beam approaches a boundary of the overhang.

In some embodiments, the processing element may calculate the values of the energy beam power and the energy beam scan speed for each line of each cross section using equations mentioned above. The calculations may be performed for all of the lines and stored in the memory element before the energy beam scanning process to form the part begins. Alternatively, the calculation of the values of the energy beam power and the energy beam scan speed for each line may be performed as needed, such as before each line is scanned during the process of forming the part. In other embodiments, the values of the energy beam power and the energy beam scan speed for lines of a plurality of lengths may be stored as a table in the memory element. The processing element may access the memory element and look up the values of the energy beam power and the energy beam scan speed.

Referring to step 505, the energy beam power and the energy beam scan speed for each line of the path for each cross section are communicated to the energy beam generator assembly 12 and beam steering system 32. In some embodiments, the processing element 40 may transmit a first signal to the energy beam power source 30, wherein the first signal includes an electrical characteristic, such as an electric current, a voltage, a resistance, etc., which is varied according to the value of the energy beam power for the currently scanned line. For example, the first signal having a greater electric current may correspond to a greater energy beam power. Additionally or alternatively, the processing element 40 may transmit data to the energy beam power source which includes instructions, a sequence of values, or the like that sets the level of the energy beam power for the currently-scanned line. Likewise with the scan speed, the processing element 40 may transmit a second signal to the energy beam steering system circuitry 34, wherein the second signal includes an electrical characteristic, such as an electric current, a voltage, a resistance, etc., which is varied according to the value of the energy beam scan speed for the currently-scanned line. For example, the second signal having a greater electric current may correspond to a greater energy beam scan speed. Additionally or alternatively, the processing element 40 may transmit data to the energy beam steering system circuitry 34 which includes instructions, a sequence of values, or the like that sets the level of the energy beam scan speed for the currently-scanned line. The processing element 40 may also transmit a third signal and/or data to the energy beam steering system circuitry 34 that provide the direction in which to guide, deflect, steer, or move the energy beam to scan the path.

Although the invention has been described with reference to the embodiments illustrated in the attached drawing figures, it is noted that equivalents may be employed and substitutions made herein without departing from the scope of the invention as recited in the claims. The concepts and principles of the current invention apply generally to other radiation beam melt technologies including selective laser melt machines.

Having thus described various embodiments of the invention, what is claimed as new and desired to be protected by Letters Patent includes the following:

1. An additive manufacturing system comprising:
   an energy beam generator that generates an energy beam to melt and fuse raw materials for a part; and
   a computing device for controlling operation of the energy beam generator, the computing device comprising—
      a memory element configured to store or access a three-dimensional model of the part, the three-dimensional model defining at least one overhang of the part,
      a processing element in electronic communication with the memory element, the processing element configured to receive at least a portion of the three-dimensional model and control a parameter of the energy beam generator according to a gradient function so as to apply a variable amount of heat to the raw material that forms the overhang,
      wherein the processing element is further configured to determine energy beam paths across the raw material; calculate a power output of the energy beam generator for the paths; and calculate a scan speed for the energy beam generator for the paths,
      wherein the parameter of the energy beam generator that is controlled according to the gradient function is both the output power and the scan speed of the energy beam generator, and
      wherein the processing element is configured to calculate the output power for the energy beam generator with a first gradient function such that the output power is at a user-selected lower output power level over most of the raw material that forms the overhang and ramps up to a relatively higher output power level approximate a boundary of the overhang, and wherein the processing element calculates the scan speed for the energy beam generator with a second gradient function such that the scan speed is set to a user-selected faster scan speed over most of the raw material that forms the overhang and ramps down to a relatively slower scan speed approximate a boundary of the overhang.

2. The additive manufacturing system of claim 1, wherein the processing element is further configured to communicate the output power and the scan speed of the energy beam generator for multiple lines in the energy beam paths.

3. An additive manufacturing system comprising:

an energy beam generator configured to generate an energy beam to melt and fuse raw materials for a part; and a computing device for controlling operation of the energy beam generator, the computing device comprising—a memory element configured to store or access a three-dimensional model of the part, the three-dimensional model defining at least one overhang of the part, and a processing element in electronic communication with the memory element, the processing element configured to receive at least a portion of the three-dimensional model and control an output power and scan speed of the energy beam generator according to a plurality of gradient functions so as to apply a variable amount of heat to the raw material that forms the overhang, wherein the processing element is configured to calculate the output power for the energy beam generator with a first gradient function such that the output power is at a user-selected lower output power level over most of the raw material that forms the overhang and ramps up to a relatively higher output power level approximate a boundary of the overhang, and wherein the processing element calculates the scan speed for the energy beam generator with a second gradient function such that the scan speed is set to a user-selected faster scan speed over most of the raw material that forms the overhang and ramps down to a relatively slower scan speed approximate a boundary of the overhang.

4. The additive manufacturing system of claim 3, wherein the processing element is further configured to determine energy beam paths across the raw material; calculate a power output of the energy beam generator for the paths; and calculate a scan speed for the energy beam generator for the paths.

5. The additive manufacturing system of claim 3 wherein the processing element is further configured to communicate the output power and the scan speed of the energy beam generator for multiple lines in the energy beam paths.

* * * * *